May 13, 1930.  E. CALKINS ET AL  1,758,217
CULTIVATOR TOOL
Filed Oct. 18, 1927
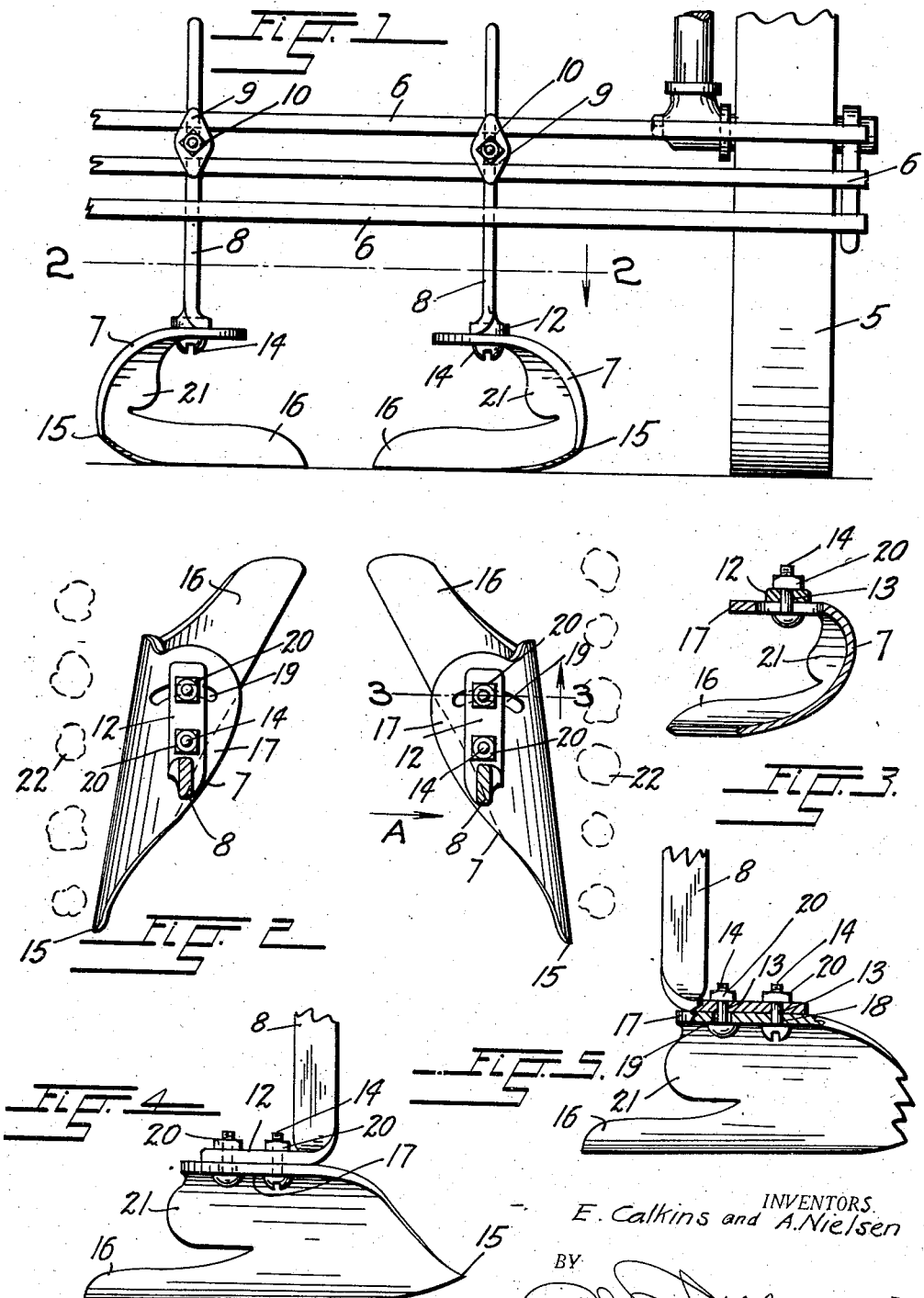
INVENTORS.
E. Calkins and A. Nielsen
BY
ATTORNEY.

Patented May 13, 1930

1,758,217

UNITED STATES PATENT OFFICE

ERNEST CALKINS AND ANDREW NIELSEN, OF BRIGHTON, COLORADO

CULTIVATOR TOOL

Application filed October 18, 1927. Serial No. 226,936.

This invention relates to cultivator tools of the kind used on cultivating machines to break the soil and cut the weeds between rows of beet plants or other standing crops.

Tools of this character are usually attached in pairs to a transverse bar of the machine to cut the soil at opposite sides of rows of plants by means of slanting blades.

It is an object of the invention to provide a cultivator tool which throws the upturned dirt back onto the face of the blade and thereby prevents it being thrown across the plants.

Another object resides in the method of associating the blade proper with the shank of the tool, which method has the advantages of presenting a clear and unobstructed working face, of permitting a ready forward or rearward adjustment of the blade and of providing for the adjustment of the angle or sweep of the blade to any selected degree within determinate limits.

Other objects of the invention are to be found in details of construction and a novel arrangement of parts as will fully appear in the course of the following description made with reference to the accompanying drawings.

In the drawings in which like parts are similarly designated throughout the views, Figure 1 represents a fragmentary front elevation of a cultivating machine, showing a pair of cultivator tools made in accordance with our invention, in operative position, Figure 2, a horizontal section taken on the line 2—2, Figure 1, Figure 3, a section along the line 3—3, Figure 2, Figure 4. a face view of the blade of one of the tools, looking in the direction of the arrow A in Figure 2, and Figure 5, a partially sectional view similar to Figure 4, showing an adjusted position of the blade with relation to its shank.

Referring further to the drawings, the reference character 5 designates one of the wheels of a cultivating machine, and 6 the tool bars at the front of the machine on which the cultivating tools are mounted in pairs. One pair of the tools is shown in the view, in their operative relative positions and each of the tools is made in accordance with the present invention as will now be described.

The tool comprises a blade member 7 and a shank member 8, the latter being adjustably attached to the tool bars by means of clips 9 and bolts 10. The shank member has at its lower end, a laterally projecting foot 12 at substantially right angles to its body portion, and the foot has a pair of holes 13 to receive the bolts 14 by which the blade is attached to the shank.

The blade member consists of a transversely curved plate pointed at its forward end as at 15 and terminating in a rearwardly ranging tail piece 16. The upper portion of the blade forms a substantially horizontal flange 17 for its attachment to the foot of the shank, the flange having a bolt hole 18 and a concentric, arcual slot 19 for the bolts by which the members of the tool are connected. The slot and the hole of the blade are to this end arranged to register with the holes of the shank, the slot being opposite the hole of the shank nearest the end of its foot.

The bolts 14 are provided with nuts 20 to clamp the members together and it will be apparent that when the nuts are loosened, the sweep or angle of the blade member is readily varied by moving the blade about the bolt nearest the body part of the shank, as an axis. The shank is also adapted for the forward or rearward adjustment of its blade relative to the bars 6 on which the tools are mounted. This adjustment is accomplished by reversing the position of the shank, so that its foot extends oppositely from the position in which it was before, as illustrated in Figures 4 and 5.

By this adjustment one of the blades of a pair of tools can be advanced with respect to the other, for the purpose of preventing clogging when the weeds between the rows of beets have a luxuriant growth of leaves.

The laterally projecting foot of the shank also provides for other adjustments of the respective blade by turning the body part of the shank on the tool bars so that its foot projects in different directions.

The blade has above its tail piece an inwardly curved shield or deflector 21, which in the operation of the machine functions to throw the upturned dirt back onto the working face of the blade from where it slides back into the furrow from which it was removed. Heretofore the dirt was thrown across the tail of the cultivator blade and frequently landed on the beet plants which thereby were damaged and covered so as to interfere with their further growth and subsequent harvest, and the provision of the deflecting shield is therefore an important feature in the construction.

It is to be observed that by fastening the shank of the tool at the top of the blade, instead of at the sides of the same, the working faces of the blade are clear and unobstructed so that the blade may cleave the ground and cut and pass between the weeds with the minimum of effort and without hindrance.

In Figure 2 of the drawings two rows of beets are indicated at 22. It is to be noted how readily the sweeps of the blades may be varied according to the distances between the rows of beets and how close the tool can work to the plants without injuring the same. This feature taken together with the shields 21 which prevent the dirt from being thrown onto the plants renders the tools made in accordance with the present invention, equivalent in function and operation and in other respects superior to the disks frequently used in cultivating machines where it is desired to work close to the standing crops.

Having thus described our invention, what we claim and desire to secure by Letters Patent is:—

1. In a cultivator, a blade pointed in the direction of the operative movement of the cultivator and transversely curved to provide a ground portion and a flange-portion extending over said ground portion inwardly with respect to the cultivator, the flange-portion having at its end remote from the point of the blade, an inwardly curving deflector adapted to throw dirt upturned by the ground portion in the operation of the cultivator, back onto the blade, and a shank-member extending downwardly on the cultivator, and attached exteriorly of the flange-portion of the blade.

2. In a cultivator, a blade pointed in the direction of the operative movement of the cultivator and transversely curved to provide a ground portion and a flange-portion extending over said ground portion inwardly with respect to the cultivator, the flange-portion having at its end remote from the point of the blade, an inwardly curving deflector adapted to throw dirt upturned by the ground portion in the operation of the cultivator, back onto the blade, and a shank-member extending downwardly on the cultivator, and adjustably connected exteriorly of the flange-portion of the blade, for rotary adjustment of the blade in a substantially horizontal plane.

In testimony whereof we have affixed our signatures.

ERNEST CALKINS.
ANDREW NIELSEN.